(12) United States Patent
Miyazaki et al.

(10) Patent No.: US 8,909,006 B2
(45) Date of Patent: Dec. 9, 2014

(54) OPTICAL WAVEGUIDE DEVICE

(75) Inventors: Norikazu Miyazaki, Tokyo (JP); Kei Katou, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 13/876,717

(22) PCT Filed: Sep. 29, 2011

(86) PCT No.: PCT/JP2011/072326
§ 371 (c)(1),
(2), (4) Date: Mar. 28, 2013

(87) PCT Pub. No.: WO2012/043694
PCT Pub. Date: Apr. 5, 2012

(65) Prior Publication Data
US 2013/0195400 A1    Aug. 1, 2013

(30) Foreign Application Priority Data
Sep. 30, 2010    (JP) .................................. 2010-222709

(51) Int. Cl.
*G02B 6/12*    (2006.01)
*G02B 6/125*    (2006.01)
*G02B 6/42*    (2006.01)
*G02F 1/225*    (2006.01)

(52) U.S. Cl.
CPC .............. *G02B 6/125* (2013.01); *G02B 6/4286* (2013.01); *G02F 1/2255* (2013.01); *G02F 2201/066* (2013.01); *G02F 2201/58* (2013.01)
USPC .............. 385/14; 385/129; 359/618; 372/108

(58) Field of Classification Search
USPC ...................... 385/14, 129; 359/618; 372/108
See application file for complete search history.

(56) References Cited

U.S. PATENT DOCUMENTS

| | | | | |
|---|---|---|---|---|
| 6,061,487 A | * | 5/2000 | Toyama et al. | 385/47 |
| 6,081,639 A | * | 6/2000 | Kagami et al. | 385/32 |
| 6,718,098 B2 | * | 4/2004 | Kimura | 385/49 |

(Continued)

FOREIGN PATENT DOCUMENTS

| | | | | |
|---|---|---|---|---|
| JP | 09258285 A | * | 10/1997 | G02F 2/02 |
| JP | 10-54915 A | | 2/1998 | |

(Continued)

OTHER PUBLICATIONS

Isutzu, et al., "Integurated Optical SSB Modulator/Frequency Shifter." IEEE Journal of Quantum Electronics, vol. QE-17, No. 11, 1981, pp. 2225-2227.

*Primary Examiner* — Peter Radkowski
(74) *Attorney, Agent, or Firm* — Taft Stettinius & Hollister LLP

(57) ABSTRACT

An optical waveguide device is provided which can efficiently guide undesired light to the outside of a substrate or the outside of the overall optical waveguides even when optical waveguides are integrated. In the optical waveguide device, an optical waveguide is formed on a substrate, the optical waveguide includes a main waveguide in which signal light propagates and an undesired-light waveguide for removing undesired light from the main waveguide, and the undesired-light waveguide is separated by the main waveguide interposed therebetween at an intersection in which the undesired-light waveguide and the main waveguide intersect each other.

17 Claims, 4 Drawing Sheets

(56) References Cited

U.S. PATENT DOCUMENTS

| | | | |
|---|---|---|---|
| 7,310,453 B2 * | 12/2007 | Ichikawa et al. | 385/3 |
| 7,362,924 B2 * | 4/2008 | Ichioka et al. | 385/2 |
| 7,386,213 B2 * | 6/2008 | Shimizu et al. | 385/129 |
| 7,444,039 B2 * | 10/2008 | Kondou et al. | 385/2 |
| 7,580,597 B2 * | 8/2009 | Kitoh et al. | 385/14 |
| 7,831,122 B2 * | 11/2010 | Kondou et al. | 385/129 |
| 7,891,885 B2 * | 2/2011 | Ariga et al. | 385/92 |
| 7,899,338 B2 * | 3/2011 | Hashimoto et al. | 398/198 |
| 8,625,943 B2 * | 1/2014 | Soma et al. | 385/38 |
| 2003/0007735 A1 * | 1/2003 | Kimura | 385/49 |
| 2004/0228573 A1 * | 11/2004 | Terakawa et al. | 385/24 |
| 2006/0051011 A1 * | 3/2006 | Ohmori et al. | 385/14 |
| 2006/0110089 A1 * | 5/2006 | Ichikawa et al. | 385/3 |
| 2007/0019968 A1 * | 1/2007 | Hashimoto et al. | 398/198 |
| 2007/0025671 A1 * | 2/2007 | Shimizu et al. | 385/129 |
| 2007/0053625 A1 * | 3/2007 | Ichioka et al. | 385/2 |
| 2008/0002926 A1 * | 1/2008 | Kondou et al. | 385/2 |
| 2008/0232736 A1 * | 9/2008 | Kitoh et al. | 385/14 |
| 2009/0116781 A1 * | 5/2009 | Ichikawa | 385/5 |
| 2009/0245723 A1 * | 10/2009 | Hashimoto et al. | 385/14 |
| 2010/0086252 A1 * | 4/2010 | Kinpara et al. | 385/2 |
| 2010/0111468 A1 * | 5/2010 | Funabashi et al. | 385/14 |
| 2011/0064355 A1 * | 3/2011 | Soma et al. | 385/14 |

FOREIGN PATENT DOCUMENTS

| | | | | |
|---|---|---|---|---|
| JP | 10054915 A | * | 2/1998 | G02B 6/122 |
| JP | 10073791 A | * | 3/1998 | G02F 1/025 |
| JP | 10300956 A | * | 11/1998 | G02B 6/122 |
| JP | 10-325910 A | | 12/1998 | |
| JP | 10319361 A | * | 12/1998 | G02F 1/035 |
| JP | 10325910 A | * | 12/1998 | G02B 6/122 |
| JP | 2004-46021 A | | 2/2004 | |
| JP | 2004046021 A | * | 2/2004 | G02B 6/122 |
| JP | 2005-181748 A | | 7/2005 | |
| JP | 2005181748 A | * | 7/2005 | G02B 6/122 |
| JP | 2006276518 A | * | 10/2006 | |
| JP | 2006-301612 A | | 11/2006 | |
| JP | 2006301612 A | * | 11/2006 | |
| JP | 2007-264488 A | | 10/2007 | |
| JP | 2008-89875 A | | 4/2008 | |
| JP | 2008089875 A | * | 4/2008 | |
| JP | 2009-204736 A | | 9/2009 | |
| JP | 2010-85738 A | | 4/2010 | |
| JP | 2011186258 A | * | 9/2011 | |
| WO | 2004/092792 A1 | | 10/2004 | |

* cited by examiner

OPTICAL WAVEGUIDE DEVICE

BACKGROUND OF THE INVENTION

1. Field of the Invention

The present invention relates to an optical waveguide device, and more particularly, to an optical waveguide device in which an optical waveguide formed on a substrate includes a main waveguide having signal light propagating therein and an undesired light waveguide used to remove undesired light from the main waveguide.

2. Description of Related Art

In the fields of optical communications, optical measurements, and optical information processing, optical waveguide devices have been used in which an optical waveguide is formed on a dielectric substrate of lithium niobate or the like. In the optical waveguide used in the optical waveguide devices, portions branching or combining the optical waveguide are formed, like Mach-Zehnder type Optical waveguides widely used in optical modulators, optical switches, or the like.

In the portion combining the optical waveguides, out-phase light is radiated into the substrate as a radiation mode light, as described in Japanese Laid-open Patent Publication No. 2006-301612. Therefore, in order to cause the radiation-mode light not to be re-coupled to signal light, shielding means is provided or an optical waveguide guiding the radiation-mode light to the outside is provided.

As shown in Japanese Laid-open Patent Publication No. 2008-089875, when higher-mode light is included in signal light at the time of branching the optical waveguide, there is a problem in that that a branching portion of an optical waveguide has a difficulty in branching the signal light at a predetermined branching ratio. Therefore, unnecessary higher-mode light is removed from signal light in front stage of the branching portion. As this removal method, an optical waveguide that guide the higher-mode light to the outside is provided.

On the other hand, as described in Izutsu et al. "Integrated Optical SSB Modulator/Frequency Shifter", IEEE Journal of Quantum Electronics, vol. QE-17, No. 11, 1981, pp. 2225-2227, an integrated modulator structure is proposed in which plural optical waveguides are integrated. Plural branching portions or combining portions are formed in such an optical waveguide device. Accordingly, undesired light from the optical waveguides arranged along the outside of the overall optical waveguides can be easily removed, but it is very difficult to remove undesired light from branching portions or combining portions arranged inside the overall optical waveguides.

In order to achieve an increase in frequency bandwidth of a modulation signal or a decrease in driving voltage of an optical modulator or the like, a substrate of an optical waveguide device is formed of a thin plate with a thickness of 30 μm or less. In this thin plate, undesired light such as radiation-mode light radiated into the substrate propagates with the substrate itself as a slab waveguide, the probability of re-coupling of the undesired light with signal light increases a lot.

SUMMARY OF THE INVENTION

The invention is made to solve the above-mentioned problems and an object thereof is to provide an optical waveguide device which can efficiently guide undesired light to the outside of a substrate or the outside of an entire optical waveguide even when the optical waveguide is integrated.

According to a first aspect of the invention, there is provided an optical waveguide device in which an optical waveguide is formed on a substrate and the optical waveguide includes a main waveguide in which signal light propagates and an undesired-light waveguide for removing undesired light from the main waveguide, wherein the undesired-light waveguide is separated by the main waveguide interposed therebetween at an intersection in which the undesired-light waveguide and the main waveguide intersect each other.

A second aspect of the invention provides the optical waveguide device according to the first aspect, wherein an intersection angle at which a straight line connecting the undesired-light waveguides separated in the intersection intersects the main waveguide is in the range of 3 degrees to 177 degrees.

A third aspect of the invention provides the optical waveguide device according to the first or second aspect, wherein a distance between ends of the undesired-light waveguides separated in the intersection and the main waveguide is 10 μm or more.

A fourth aspect of the invention provides the optical waveguide device according to any one of the first to third aspects, wherein a width of the undesired-light waveguide is larger just after the intersection than just before the intersection.

A fifth aspect of the invention provides the optical waveguide device according to any one of the first to fourth aspects, wherein a thickness of the substrate is 30 μm or less.

A sixth aspect of the invention provides the optical waveguide device according to any one of the first to fifth aspects, wherein the undesired light is higher-mode light propagating in the optical waveguide or radiation-mode light radiated from a combining portion of the optical waveguide.

According to the first aspect of the invention, since the undesired-light waveguide is separated by the main waveguide interposed therebetween at the intersection in which the undesired-light waveguide and the main waveguide intersect each other, it is possible to prevent the undesired-light waveguide from coming in contact with the main waveguide to re-couple undesired light with signal light and to guide undesired light to the outside of the substrate or the outside of the entire optical waveguides by going over the main waveguide. Particularly, it is possible to suppress degradation in optical characteristics such as an extinction ratio or signal crosstalk of the optical waveguide device due to re-coupling of the undesired light with the signal light.

According to the second aspect of the invention, since the intersection angle at which the straight line connecting the undesired-light waveguides separated at the intersection and the main waveguide intersect each other is in the range of 3 degrees to 177 degrees, it is possible to suppressing the re-coupling of the undesired light with the main waveguide.

According to the third aspect of the invention, since the distance between the ends of the undesired-light waveguide separated at the intersection and the main waveguide is 10 μm or more and the undesired-light waveguides are separated by the mode diameter of signal light propagating in the main waveguide, the signal light is not coupled or scattered by the undesired-light waveguide and the degradation of the signal light is suppressed.

According to the fourth aspect of the invention, since the width of the undesired-light waveguide is larger just after the intersection than just before the intersection, undesired light emitted from the undesired-light waveguide just before the intersection can be efficiently recovered by the undesired-light waveguide just after the intersection and it can be efficiently guided to the outside of the substrate.

According to the fifth aspect of the invention, since the thickness of the substrate is 30 μm or less, the substrate serves as a slab waveguide and it is possible to efficiently guide the undesired light to the outside of the substrate or the like by employing the configuration of the invention even in situations in which it is difficult to discharge the undesired light to the outside of the substrate.

According to the sixth aspect of the invention, the undesired light is higher-mode light propagating in the optical waveguide or radiation-mode light radiated from a combining portion of the optical waveguide. Accordingly, by employing the configuration of the invention for an optical waveguide device including plural branching portions or combining portions of optical waveguides, it is possible to provide an optical waveguide device in which degradation in optical characteristics such as an extinction ratio or signal crosstalk is suppressed.

DETAILED DESCRIPTION OF THE INVENTION

Figure 1A:
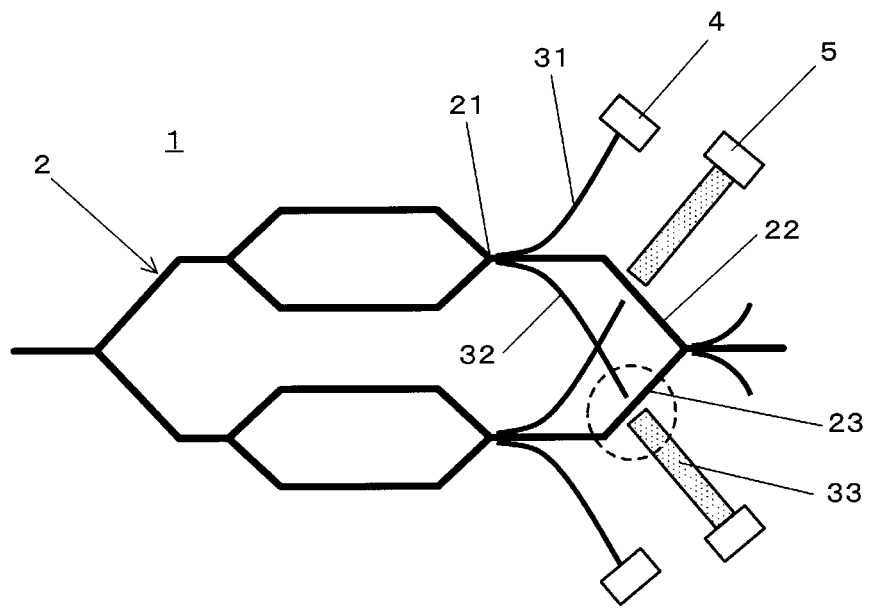
FIG. 1A is a diagram schematically illustrating the entire configuration of an optical waveguide device according to the invention.

Hereinafter, an optical waveguide device according to the invention will be described in detail with reference to a suitable example. FIG. 1A is a diagram schematically illustrating the entire configuration of an optical waveguide section of an optical waveguide device according to the invention and FIG. 1B is an enlarged view of a part surrounded with a dotted line in FIG. 1A.

Figure 1B:
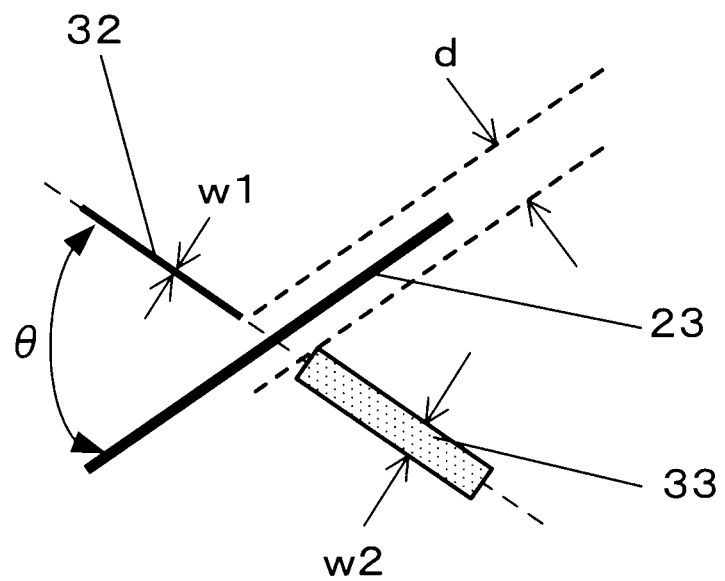
FIG. 1B is an enlarged view of a part surrounded with a dotted line in FIG. 1A.

As shown in FIGS. 1A and 1B, the optical waveguide device according to the invention is an optical waveguide device in which an optical waveguide 2 is formed on a substrate 1 and the optical waveguide includes main waveguides 21 to 23 in which signal light propagates and undesired-light waveguides 31 to 33 for removing undesired light from the main waveguides, wherein the undesired-light waveguides 32 and 33 are separated by the main waveguide interposed therebetween at intersections in which the undesired-light waveguides and the main waveguides intersect each other.

The substrate used in the optical waveguide device according to the invention is not particularly limited as long as an optical waveguide can be formed on the substrate. When a control electrode controls signal light by an electric field applied to the optical waveguide like an optical modulator or an optical switch, any monocrystalline material such as $LiNbO_3$, $LiTaO_5$, and PLZT (Lead Lanthanum Zirconate Titanate) having an electro-optical effect can be suitably used for the substrate. Particularly, $LiNbO_3$ and $LiTaO_5$ widely used for optical control devices such as optical modulators can be preferably used.

Particularly, the substrate used in the invention can be applied with technical superiority of the invention when the thickness of the substrate is 30 μm or less. Such thin substrate is useful for achieving an increase in modulation speed or a decrease in driving voltage of optical waveguide devices such as optical modulators, but it is difficult to discharge undesired light radiated in the substrate to the outside of the substrate, thereby easily causing a problem with re-coupling with signal light. Therefore, by employing the configuration of the invention, it is possible to effectively guide undesired light to the outside of the substrate or the like.

The optical waveguides are formed on the substrate, for example, by thermally diffusing a material such as titanium (Ti) having a high refractive index on an $LiNbO_3$ substrate (LN substrate). The shape of the optical waveguide is not limited to the shape shown in FIGS. 1A and 1B, but the invention can be suitably applied to an optical waveguide device having a shape in which a part of an undesired-light waveguide is not guided to the outside due to the main waveguide in which signal light propagates, such as an example where an optical waveguide includes a branching portion or a combining portion and an undesired-light waveguide for removing higher-mode light is formed in front stage of the branching portion or an example where an undesired-light waveguide for guiding radiation-mode light from the combining portion is formed.

The optical waveguide 2 shown in FIGS. 1A and 1B is a so-called nest type optical waveguide in which two sub Mach-Zehnder type optical waveguides are inserted into a main Mach-Zehnder type optical waveguide. In this way, an optical modulator is used in an SSb modulator, a DQPSK modulator, or the like. When out-phase light is coupled, radiation-mode light is radiated from the combining portion 21 of the optical waveguide. As described in Japanese Laid-open Patent Publication No. 2006-301612, undesired-light waveguides 31 and 32 are formed to guide the radiation-mode light as undesired light to the outside of the substrate or the outside of the entire optical waveguide. An optical detector 4 for monitoring radiation-mode light, an absorption member 5 of metal or the like, for absorbing undesired light is disposed in the guide destination of undesired light.

The undesired-light waveguide 31 does not cause any particular problem because it does not need to extend over the main waveguide to go to the outside of the substrate, but the undesired-light waveguide 32 cannot be drawn to the outside of the substrate or the outside of the entire optical waveguide, for example, because the main waveguide 23 is present.

In this case, according to the invention, the undesired-light waveguide is separated into two parts 32 and 33 at the intersection with the main waveguide. The detailed configuration of the intersection is shown in the enlarged view of FIG. 1B.

As one feature of the intersection, the intersection angle θ at which a straight line connecting the undesired-light waveguides 32 and 33 separated at the intersection and the main waveguide 23 intersect each other is set to be in the range of 3 degrees to 177 degrees. By employing this configuration, it is possible to suppress re-coupling of undesired light with the main waveguide.

As another feature of the intersection, the distance between ends of the undesired-light waveguides 32 and 33 separated at the intersection and the main waveguide 23 is set to 10 μm or more. This means that the gap d in FIG. 1B is 20 μm or more.

The mode diameter of signal light propagating in the main waveguide 23 varies depending on the width of the optical waveguide, the thickness of the substrate, the difference in refractive index between the optical waveguide and the substrate, and the like. A normal optical waveguide in which Ti is diffused into an LN substrate has a width of about 10 μm. Accordingly, by securing a gap d which is double or more the mode diameter of signal light propagating in the main waveguide 23, it is possible to suppress coupling or scattering of signal light due to the undesired-light waveguides 32 and 33.

Figure 6:
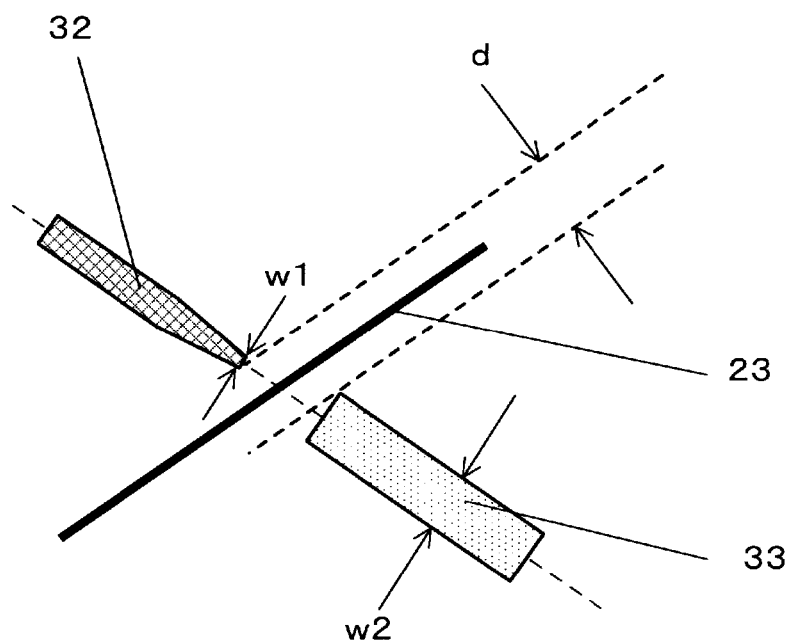
FIG. 6 is a diagram illustrating another example of an intersection portion of an undesired-light waveguide and a main waveguide.

As still another feature of the intersection, the width of the undesired-light waveguide is larger just after the intersection (w2) than just before the intersection (w1). Accordingly, undesired light discharged from the undesired-light waveguide 32 just before the intersection can be efficiently recovered by the undesired-light waveguide 33 just after the intersection and can be drawn to the outside of the substrate or the like. Particularly, by setting the width w2 after the intersection to three times or more the width w1 just before the intersection, it is possible to raise the recovery efficiency of undesired light. Regarding adjustment of the width of the undesired-light waveguide, the width of the undesired-light waveguide just after the intersection may be increased as shown in FIG. 1B, and the width of the undesired-light waveguide just before the intersection may be decreased (in a tapered shape) as shown in FIG. 6. Accordingly, since the mode diameter of the waveguide just before the intersection increases, it is possible to suppress diffusion of a beam in the separated portion of the waveguide.

By basically setting the width of the main waveguide to such a width to allow basic-mode light to mainly propagate, it is possible to effectively suppress re-coupling of higher-mode light to the main waveguide. Particularly, by employing this configuration for the main waveguide at the intersection, it is possible to suppress re-coupling of undesired light, which has been radiated from the ends of the undesired-light waveguide to the main waveguide, to the main waveguide, and it is possible to allow the undesired light to cross the main waveguide and to be incident again on the undesired-light waveguide in the rear stage.

Figure 2:
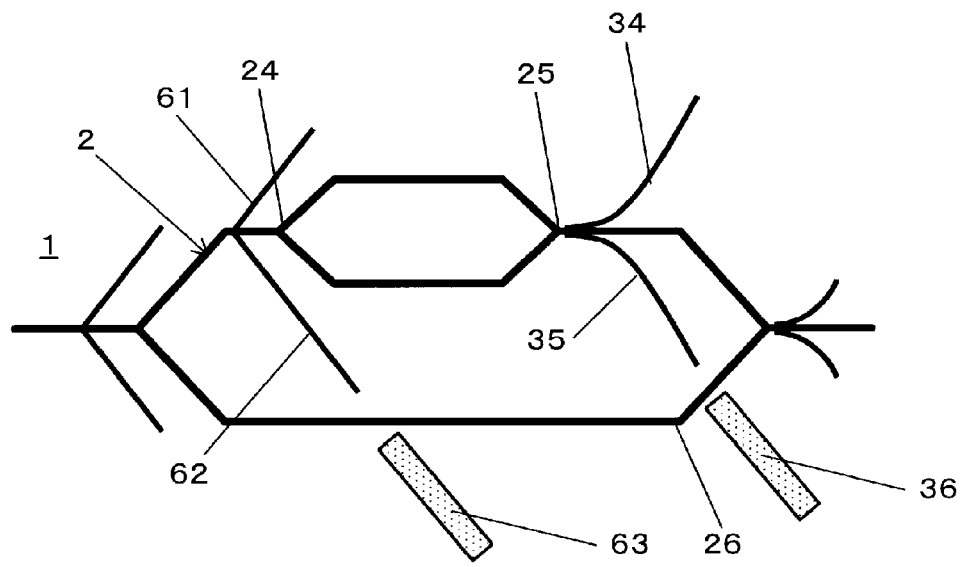
FIG. 2 is a diagram illustrating an example where an undesired-light waveguide for removing higher-mode light is disposed in the front stage of a branching portion of an optical waveguide.

FIG. 2 shows an example where undesired-light waveguides 61 and 62 for removing higher-mode light is disposed in the front stage of a branching portion 24 of an optical waveguide. In this way, the undesired-light waveguide is used as a member for removing higher-mode light as described in Japanese Laid-open Patent Publication No. 2008-089875, in addition to the above-mentioned radiation-mode light.

In FIG. 2, the configuration of the intersection shown in FIG. 1B is employed for the undesired-light waveguide 62 to cross the main waveguide 26. Reference numeral 63 represents an undesired-light waveguide in the rear stage after being separated. In the combining portion 25, similarly to FIGS. 1A and 1B, undesired-light waveguides 34 and 35 for drawing radiation-mode light are formed. The undesired-light waveguide 35 is separated by the main waveguide 26 in the middle and extends as the undesired-light waveguide 36.

Figure 3:
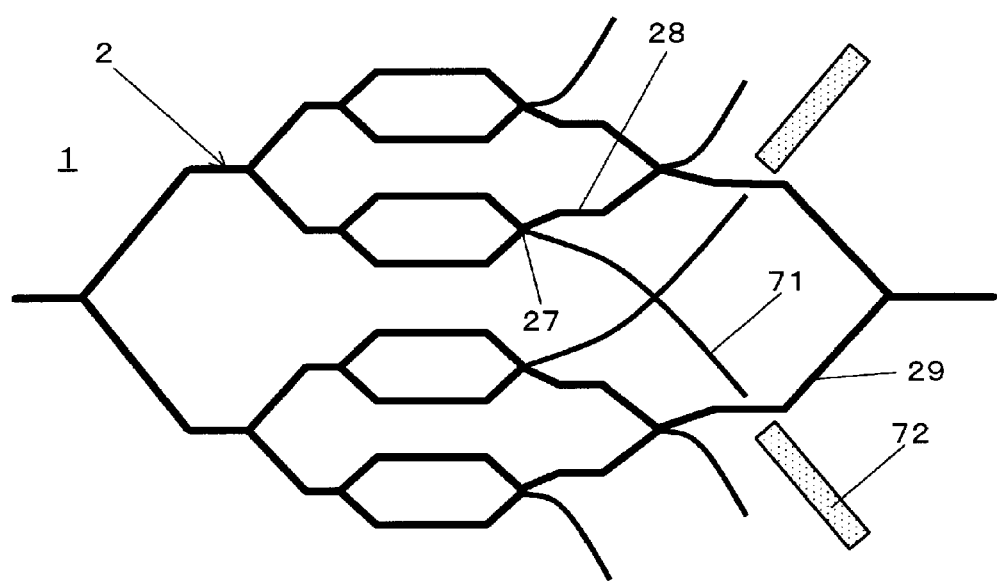
FIG. 3 is a diagram illustrating an example where an asymmetric X coupler is used for a combining portion of an optical waveguide.

FIG. 3 shows an example where an asymmetric X coupler 27 is used for a combining portion of an optical waveguide. As shown in FIGS. 1A and 1B, the X-Y coupler (with a structure including two inputs and three outputs having different waveguide widths at the center and the outside) has been described as the combining portion, but the combining portion employing the structure according to the invention is not limited to this structure and may employ a directive coupler, an asymmetric directive coupler, an asymmetric X coupler, or the like. In the asymmetric X coupler, optical wave propagates in the main waveguide 28 when in-phase lights are coupled, and optical wave propagates in the undesired-light waveguide 71 when out-phase lights are coupled. The undesired-light waveguide is separated into waveguides 71 and 72 to cross the main waveguide 29, as shown in FIG. 1B.

Figure 4:
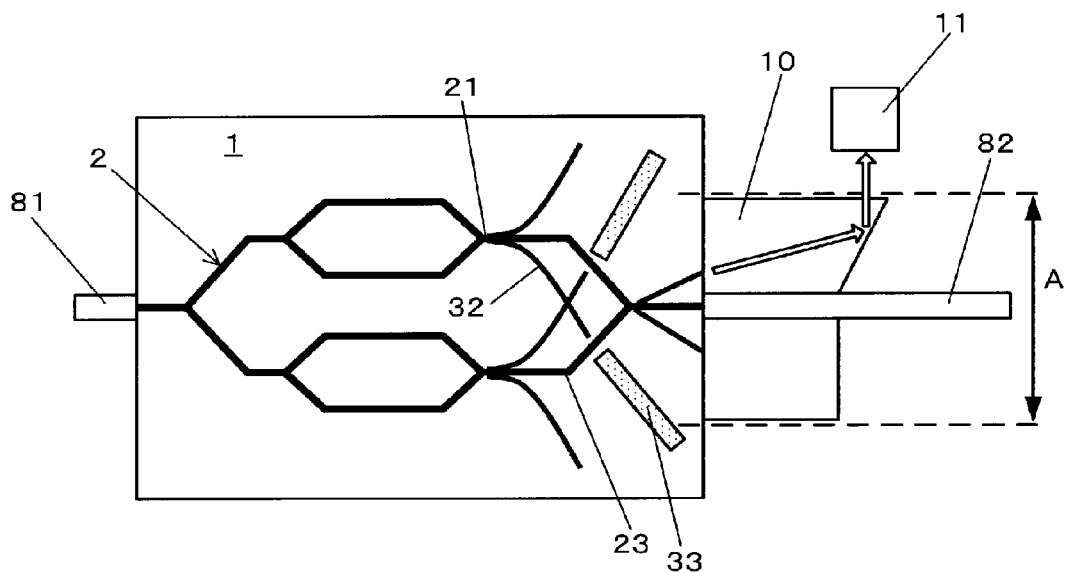
FIG. 4 is a diagram illustrating an example where an optical waveguide device is combined with an optical system for detecting monitoring light.

FIG. 4 shows an example where an optical waveguide device is combined with an optical system for detecting monitoring light. An optical waveguide formed on a substrate 1 basically has the same configuration as shown in FIGS. 1A and 1B. The optical waveguide device having the substrate 1 is connected to an incidence-side optical fiber 81 and an exit-side optical fiber 82. A capillary 10 is used to couple the optical fiber 82 to the optical waveguide device. A part of an end face of the capillary 10 is configured to introduce a part of radiation-mode light (thick arrow) as monitoring light into a light-receiving element 11.

In order not to mix undesired light into the monitoring light shown in FIG. 4, the optical waveguide device needs to be configured to prevent undesired light from going into the range of area A and the termination of the separated undesired-light waveguide 33 is located outside area A.

Figure 5:
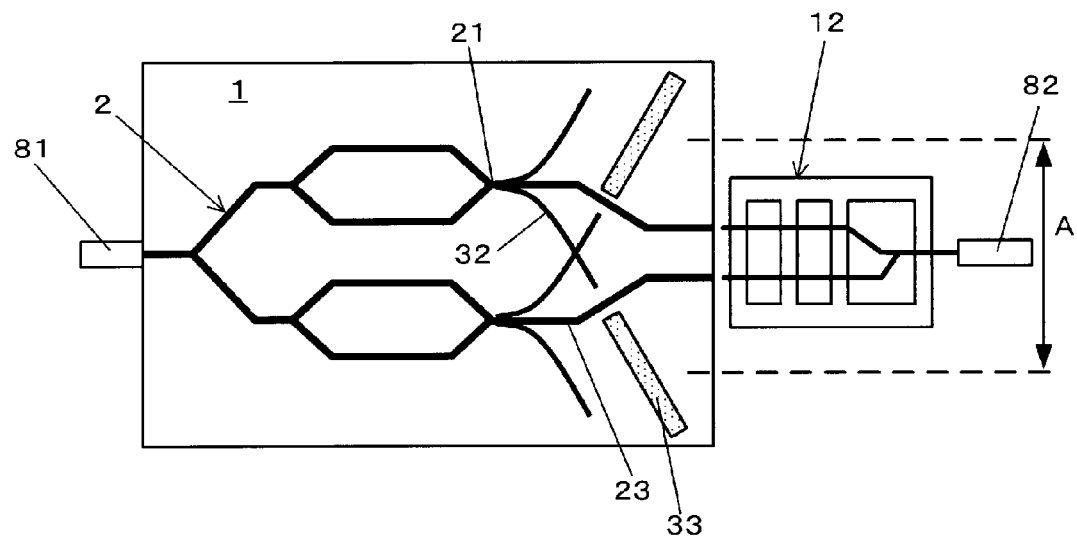
FIG. 5 is a diagram illustrating an example where an optical waveguide device is combined with a polarized wave synthesizing and modulating unit.

FIG. 5 shows an example where a polarized wave synthesizing and modulating unit 12 is combined with the optical waveguide device. The polarized wave synthesizing and modulating unit 12 rotates the polarization plane of two signal lights output from the optical waveguide device, and couples two signal lights so that the polarization planes thereof are perpendicular to each other, for example. In order to prevent undesired light from going into the portion of the polarized wave synthesizing and modulating unit 12, an undesired-light waveguide is disposed to draw undesired light to the outside of the range of area A.

As described above, according to the invention, it is possible to provide an optical waveguide device which can efficiently guide undesired light to the outside of a substrate or the outside of an entire optical waveguide even when optical waveguides are integrated.

What is claimed is:

1. An optical waveguide device, comprising: an optical waveguide formed on a substrate, the optical waveguide comprising a main waveguide in which signal light propagates, and an undesired-light waveguide for removing undesired light from the main waveguide, wherein
   the undesired-light waveguide extends from an inside of an area surrounded by the main waveguide to an outside of the area surrounded by the main waveguide, and
   the undesired-light waveguide is separated into two portions by the main waveguide interposed between said two portions at an intersection in which the undesired-light waveguide and the main waveguide intersect each other.

2. The optical waveguide device according to claim 1, wherein an intersection angle at which a straight line connecting the two portions of the undesired-light waveguide intersects with the main waveguide is in the range of 3 degrees to 177 degrees.

3. The optical waveguide device according to claim 1, wherein a distance between ends of the undesired-light waveguide portions separated at the intersection with the main waveguide is 10 μm or more.

4. The optical waveguide device according to claim 1, wherein a width of the undesired-light waveguide portion after the intersection is larger than a width of the undesired-light waveguide portion before the intersection.

5. The optical waveguide device according to claim 1, wherein a thickness of the substrate is 30 μm or less.

6. The optical waveguide device according to claim 1, wherein the undesired light is higher-mode light propagating in the optical waveguide, or radiation-mode light radiated from a combining portion of the optical waveguide.

7. The optical waveguide device according to claim 2, wherein a distance between ends of the undesired-light waveguide portions separated at the intersection with the main waveguide is 10 µm or more.

8. The optical waveguide device according to claim 2, wherein a width of the undesired-light waveguide portion after the intersection is larger than a width of the undesired-light waveguide portion before the intersection.

9. The optical waveguide device according to claim 3, wherein a width of the undesired-light waveguide portion after the intersection is larger than a width of the undesired-light waveguide portion before the intersection.

10. The optical waveguide device according to claim 2, wherein a thickness of the substrate is 30 µm or less.

11. The optical waveguide device according to claim 3, wherein a thickness of the substrate is 30 µm or less.

12. The optical waveguide device according to claim 4, wherein a thickness of the substrate is 30 µm or less.

13. The optical waveguide device according to claim 2, wherein the undesired light is higher-mode light propagating in the optical waveguide, or radiation-mode light radiated from a combining portion of the optical waveguide.

14. The optical waveguide device according to claim 3, wherein the undesired light is higher-mode light propagating in the optical waveguide, or radiation-mode light radiated from a combining portion of the optical waveguide.

15. The optical waveguide device according to claim 4, wherein the undesired light is higher-mode light propagating in the optical waveguide, or radiation-mode light radiated from a combining portion of the optical waveguide.

16. The optical waveguide device according to claim 5, wherein the undesired light is higher-mode light propagating in the optical waveguide, or radiation-mode light radiated from a combining portion of the optical waveguide.

17. An optical waveguide device, comprising: an optical waveguide formed on a substrate, the optical waveguide comprising a main waveguide in which signal light propagates, and an undesired-light waveguide for removing undesired light from the main waveguide, wherein
- the undesired-light waveguide extends from an inside of an area surrounded by the main waveguide to an outside of the area surrounded by the main waveguide,
- the undesired-light waveguide is separated into two portions by the main waveguide interposed between said two portions at an intersection in which the undesired-light waveguide and the main waveguide intersect each other,
- an intersection angle at which a straight line connecting the two portions of the undesired-light waveguide intersects with the main waveguide is in the range of 3 degrees to 177 degrees,
- a width of the undesired-light waveguide portion after the intersection is larger than a width of the undesired-light waveguide portion before the intersection, a thickness of the substrate is 30 µm or less, and
- the undesired light is higher-mode light propagating in the optical waveguide, or radiation-mode light radiated from a combining portion of the optical waveguide.

* * * * *